United States Patent [19]

Audykowski et al.

[11] 4,193,905

[45] Mar. 18, 1980

[54] CURABLE EPOXIDE RESIN MIXTURES CONTAINING DIAMINOPROPANES

[75] Inventors: Thaddeus Audykowski; Roland Moser, both of Basel, Switzerland

[73] Assignee: Ciba-Geigy Corporation, Ardsley, N.Y.

[21] Appl. No.: 856,893

[22] Filed: Dec. 2, 1977

[30] Foreign Application Priority Data

Dec. 10, 1976 [CH] Switzerland ............... 15573/76

[51] Int. Cl.$^2$ ............................................. C08G 59/50
[52] U.S. Cl. ........................... 260/30.6 R; 260/31.8 E;
260/33.2 EP; 260/37 EP; 528/88; 528/93;
528/100; 528/103; 528/104; 528/111; 528/124;
528/361; 528/367; 528/407; 525/507
[58] Field of Search ............. 260/47 EN, 2 N, 47 EC,
260/2 EC, 30.6 R, 31.8 E, 33.2 EP; 528/124,
135, 88, 93, 100, 103, 104, 111, 361, 367, 407

[56] References Cited

U.S. PATENT DOCUMENTS

| 2,839,480 | 6/1958 | Ott et al. ............................. 260/18 |
| 3,303,165 | 2/1967 | Wallis et al. ........................ 260/47 |

FOREIGN PATENT DOCUMENTS

680997 10/1952 United Kingdom.

OTHER PUBLICATIONS

Lee & Neville, "Handbook of Epoxy Resins," McGraw-Hill, 2nd Ed., 1967, pp. 7-2 to 7-5 and 7-15 to 7-16.

*Primary Examiner*—Earl A. Nielsen
*Attorney, Agent, or Firm*—Joseph F. DiPrima

[57] ABSTRACT

Curable mixtures comprising a polyepoxide compound having on average more than one epoxide group per molecule and a 1,3-diaminopropane of the formula

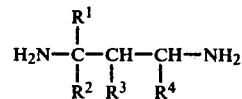

wherein $R^1$ denotes hydrogen and $R^1$, $R^2$, $R^3$ and $R^4$ each denote an alkyl having 1 to 12 C atoms, a phenyl or a heterocyclic 5-membered or 6-membered radical, or wherein $R^1$ and $R^2$ together with the C atom in the α-position of the propylenediamine from a substituted or unsubstituted aliphatic 5-membered or 6-membered ring having at most 12 C atoms and $R^3$ and $R^4$ together with the two C atoms in the α-position and the β-position of the propylenediamine form a substituted or unsubstituted aliphatic or N-heterocyclic 5-membered or 6-membered ring having at most 12 C atoms, said mixtures containing 0.5 to 1.5 equivalents of active hydrogen atoms, bonded to nitrogen, in the 1,3-diaminopropane per 1 equivalent of epoxide groups in the epoxide compound. The curable mixtures are valuable casting resins and adhesives and are suitable for the preparation of storable B-stage resins.

9 Claims, No Drawings

CURABLE EPOXIDE RESIN MIXTURES CONTAINING DIAMINOPROPANES

The invention relates to the use of specific substituted 1,3-diaminopropanes as curing agents in epoxide resin mixtures, which leads to very good results, for example in the fields of surface protection, adhesives technology, compression moulding compositions and sintering powders.

The invention relates to curable mixtures containing (a) a polyepoxide compound (X) having on average more than one epoxide group per molecule and (b) a 1,3-diaminopropane of the general formula I

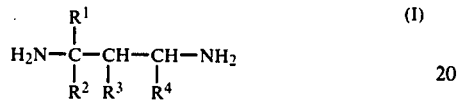

in which $R^1$, $R^2$, $R^3$ and $R^4$ are identical or different and are alkyl radicals having 1 to 12 C atoms, phenyl radicals or heterocyclic 5-membered or 6-membered radicals, or, alternatively, the radicals $R^1$ and $R^2$ together with the C atom in the α-position of the basic propylenediamine of the formula I form a substituted or unsubstituted aliphatic 5-membered or 6-membered ring having a total of at most 12 C atoms, or the radicals $R^3$ and $R^4$ together with the two C atoms in the α-position and the β-position of the basic propylenediamine form a substituted or unsubstituted aliphatic or N-heterocyclic 5-membered or 6-membered ring having a total of at most 12 C atoms, in which case, however, only $R^1$ can also be hydrogen, with the proviso that, in the mixtures, there are 0.5 to 1.5 equivalents of active hydrogen atoms, bonded to nitrogen, in the particular 1,3-diaminopropane of the formula I per 1 equivalent of epoxide groups in the epoxide compound (X).

Preferably, the curable mixtures contain a substituted 1,3-diaminopropane such that, in formula I, $R^1$ is H, $R^2$ is

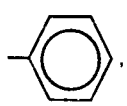

$R^3$ is H and $R^4$ is H, or $R^1$ is H, $R^2$ is

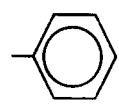

$R^3$ is H and $R^4$ is —$CH_3$, or $R^1$ is H, $R^2$ is

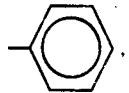

$R^3$ is H and $R^4$ is —$C(CH_3)_3$, or $R^1$ is H, $R^2$ is

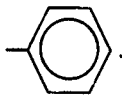

or $R^1$ is H, $R^2$ is

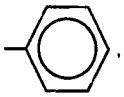

$R^3$ is H and $R^4$ is

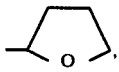

or $R^1$ is H, $R^2$ is

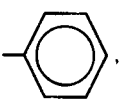

$R^3$ is H and $R^4$ is

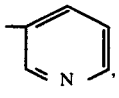

or $R^1$ is H, $R^2$ is

$R^3$ is —$CH_3$ and $R^4$ is

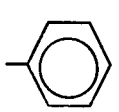

or $R^1$ is H, $R^2$ is —$CH_3$ and $R^3$ and $R^4$ together are —$(CH_2)_4$—, or $R^1$ is H, $R^3$ is

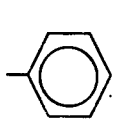

and $R^3$ and $R^4$ together are $-(CH_2)_4-$, or $R^1$ and $R^2$ together are $-(CH_2)_5-$ and $R^3$ and $R^4$ together are $-(CH_2)_4-$, or $R^1$ is H, $R^2$ is

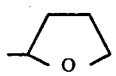

and $R^3$ and $R^4$ together are $-(CH_2)_4-$, or $R^1$ is $-CH_3$, $R^2$ is

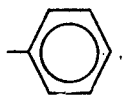

$R^3$ is H and $R^4$ is

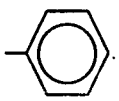

The following structures may be listed as further examples of the substituted 1,3-diaminopropanes of the formula I which are suitable for the mixtures according to the invention.

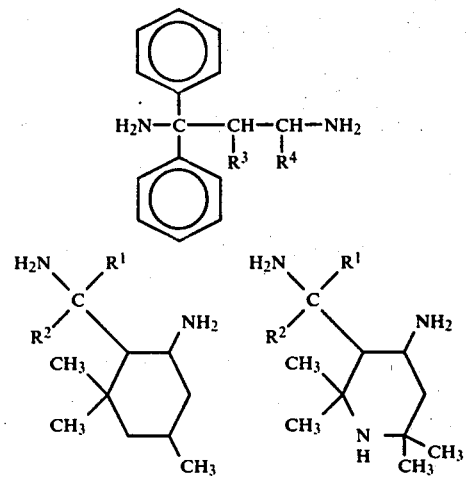

A preferred form of the curable mixtures according to the invention comprises those mixtures which contain the 1,3-diaminopropane of the formula I in the form of an adduct curing agent (E) having an amine number of 3.5 to 7.0 obtained from the 1,3-diaminopropane of the formula I and a liquid epoxide compound (Z) having, on average, more than one epoxide group per molecule, and, if desired, phenylglycide. In such mixtures there are 0.8 to 1.2 equivalents of active hydrogen atoms bonded to the nitrogen atom of the adduct curing agent (E) per 1 equivalent of epoxide groups in the epoxide compound (X). Preferably, bisphenol A epoxide resins or bisphenol F epoxide resins are employed as liquid epoxide compounds (Z) for the preparation of the adduct curing agents (E). The preparation of the adduct curing agents (E) is preferably effected by warming a mixture of a 1,3-diaminopropane of the formula I, an epoxide compound (Z) and, if desired, phenylglycide (molar ratio: 1.2:0.16:0.11) to temperatures of 120° to 200° C.

A further preferred form of the curable mixtures according to the invention comprises those which contain the 1,3-diaminopropane of the formula I in the form of an adduct curing agent (G) having an amine number of 3.5 to 7.0, obtained from the 1,3-diaminopropane of the formula I and an alkylphenol or a polyhydric phenol and, if desired, in addition a liquid epoxide compound (Z) having, on average, more than one epoxide group per molecule, there being, in the mixtures, 0.8 to 1.2 equivalents of active hydrogen atoms bonded to the nitrogen atoms of the adduct curing agent (G) per 1 equivalent of epoxide groups in the epoxide compound (X).

The preparation of these adduct curing agents (G) is preferably effected by warming a mixture of the 1,3-diaminopropane of the formula I with the alkylphenol or the polyhydric phenol to a temperature of 50° to 150° C. If desired, a second reaction stage follows in which the product thus obtained in the first stage is reacted with the liquid epoxide compound (Z) at a temperature of 50° to 200° C. The 1,3-diaminopropane of the formula I, the alkylphenol or the polyhydric phenol and, where appropriate, the epoxide compound (Z) are in a molar ratio of about 6:1:3.

The adduct curing agent (G) in the mixtures according to the invention preferably contain nonylphenol as an alkylphenol and preferably contain resorcinol as a polyhydric phenol.

Both the adduct curing agent (E) and the adduct curing agent (G) can additionally also contain 5 to 10% by weight, relative to the pure adduct curing agent, of salicylic acid as a reaction accelerator.

The substituted 1,3-diaminopropanes of the formula I contained in the mixtures according to the invention are substances which are known per se. In general they are synthesised by first reacting suitable vinyl ketones with hydrazine with cyclisation to 2-pyrazolines and then subjecting the latter to catalytic hydrogenation. By this means the substituted 1,3-diaminopropanes are finally obtained, presumably via the corresponding pyrazolidines as an intermediate and with scission of the N—N bond of the ring system. Examples of such diamines and the preparation thereof are described in a publication by A. N. Kost et al in Proceed. Of the Academy of Science USSR (1959) 1,139.

The synthesis proceeds in accordance with the following general equation:

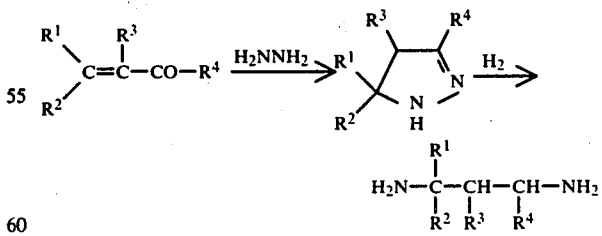

Polyepoxide compounds (X) which can be used in the curable mixtures according to the invention are, in particular, those having, on average, more than one glycidyl group, β-methylglycidyl group or 2,3-epoxycyclopentyl group bonded to a hetero-atom (for example sulphur and preferably oxygen or nitrogen); preferred compounds are bis-(2,3-epoxycyclopentyl)ether; di- and poly-glycidyl ethers of polyhydric aliphatic alcohols, such as 1,4-butanediol, or polyalkylene glycols, such as polypropylene glycol; di- or poly-glycidyl ethers of cycloaliphatic polyols, such as 2,2-bis-(4-hydroxycyclohexyl)-propane; di- and poly-glycidyl ethers of polyhydric phenols, such as resorcinol, bis-(p-hydroxyphenyl)-methane, 2,2-bis-(p-hydroxyphenyl)-propane (=diomethane), 2,2-bis-(4'-hydroxy-3',5'-dibromophenyl)-propane and 1,1,2,2-tetrakis-(p-hydroxyphenyl)-ethane, or of condensation products of phenols and formaldehyde which are obtained under acid conditions, such as phenol novolacs and cresol novolacs; di- and poly-($\beta$-methylglycidyl) ethers of the polyhydric alcohols or polyhydric phenols listed above; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidylaniline, N,N-diglycidyltoluidine and N,N,N',N'-tetraglycidyl-bis-(p-aminophenyl)methane; triglycidyl isocyanurate; N,N'-diglycidylethylene ureas; N,N'-diglycidyl-5,5-dimethylhydantoin and N,N'-diglycidyl-5-isopropyl-hydantoin; and N,N'-diglycidyl-5,5-dimethyl-6-isopropyl-5,6-dihydro-uracil.

If desired, active diluents, for example styrene oxide, butyl glycidyl ether, isooctyl glycidyl ether, phenyl glycidyl ether, cresyl glycidyl ether or glycidyl esters of synthetic, highly branched and in the main tertiary, aliphatic monocarboxylic acids ("CARDURA E"), can be added to the polyepoxides in order to lower the viscosity.

When the free 1,3-diaminopropanes of the formula I are used, curing of the curable mixtures according to the invention to give mouldings and the like is effected in the temperature range of 20° to 160° C. If, however, the mixtures contain the described adduct curing agents of the 1,3-diaminopropanes of the formula I, curing is preferably effected at temperatures of 5° to 250° C.

In order to shorten the gelling and curing times, known accelerators for amine curing, for example monophenols or polyphenols, such as phenol or diomethane, salicylic acid, tertiary amines or salts of thiocyanic acid, such as NH$_4$SCN, can be added.

Furthermore, customary modifiers, such as extenders, fillers and reinforcing agents, pigments, dyes, organic solvents, plasticisers, flow control agents, agents for conferring thixotropy, flameproofing agents and mould release agents, can be added to the curable mixtures, according to the invention, of polyepoxide compounds (X) and 1,3-diaminopropanes of the formula I or corresponding adduct curing agents at any stage prior to curing.

The following may be mentioned as examples of extenders, reinforcing agents, fillers and pigments which can be employed in the curable mixtures according to the invention: coal tar, bitumen, liquid coumarone/indene resins, textile fibres, glass fibres, asbestos fibres, boron fibres, carbon fibres, cellulose, polyethylene powders and polypropylene powders; quartz powders; mineral silicates, such as mica, asbestos powder or slate powder; kaolin, aluminium oxide trihydrate, chalk powder, gypsum, antimony trioxide, bentones, silica aerogel ("AEROSIL"), lithopones, baryte, titanium dioxide, carbon black, graphite, oxide colours, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone alcohol, ethylene glycol monomethyl ether, ethylene glycol monoethyl ether and ethylene glycol monobutyl ether.

Examples of plasticisers which can be employed for modifying the curable mixtures are, for example, dibutyl phthalate, dioctyl phthalate and dinonyl phthalate, tricresyl phosphate, trixylenyl phosphate, diphenoxyethylformal and polypropylene glycols. These plasticisers can also already be constituents of the curing agent, especially of the adduct curing agent (E) or of the adduct curing agent (G). In such cases, the plasticiser is in a concentration of 25 to 50% by weight, relative to the pure curing agent.

Substances which can be added as flow control agents when the curable mixtures are employed in particular in surface protection are, for example, silicones, liquid acrylic resins, cellulose acetobutyrate, polyvinylbutyral, waxes, stearates and the like (some of which are also used as mould release agents).

Particularly for use in the lacquer field, the polyepoxide compounds can also be partially esterified in a known manner with carboxylic acids, such as, especially, higher unsaturated fatty acids. It is also possible to add other curable synthetic resins, for example phenoplasts or aminoplasts, to such lacquer resin formulations.

The epoxide resin mixtures according to the invention are also particularly suitable for the production of prereaction products with epoxide resins, i.e. for the preparation of so-called B-stages, such as are used, for example, for application as compression moulding compositions or for the prepregs for laminates. When preparing such B-stages, as is known, the corresponding epoxide resin is mixed with the curing agent and the mixture is stored at room temperature for several days (for example 1 to 14 days) or is warmed for a short time (for example for 1 hour at 60° C.). The B-stages which thus form are used, as is known, inter alia as compression moulding compositions, sintering powders and adhesives. The B-stages based on the curable mixtures according to the invention are, surprisingly, superior to the conventional B-stages based on aromatic amines. As is known, epoxide resin mixtures containing aliphatic and cycloaliphatic amines are virtually completely unsuitable for the preparation of B-stages because their reactivity is too great.

The production of the curable mixtures according to the invention can be effected in a conventional manner with the aid of known mixing equipment (stirrers, kneaders, rolls or, in the case of solid substances or powders, mills or dry mixers). In some cases brief warming of the mixture is necessary in order to achieve adequate homogeneity.

The curable epoxide resin mixtures according to the invention are employed in particular in the fields of surface protection, the electrical industry, laminating processes, adhesives technology and the building trade. They can be used in a formulation suited in each case to the particular application, in the unfilled or filled state, if appropriate in the form of solutions or emulsions, as paints, solvent-free coatings, lacquers, sintering powders, compression moulding compositions, injection moulding formulations, dipping resins, casting resins, impregnating resins, binders and adhesives and as tool resins, laminating resins, sealing and filling compositions, floor covering compositions and binders for mineral aggregates.

Especially in the lacquer field, the mixtures according to the invention lead to a particular technical advance. The lacquers have a long pot life (for example 70 to 90 minutes) and good properties from the point of view of lacquer technology. The colour stability of the coatings which are obtainable is outstanding. In general, the curable mixtures according to the invention lead to bodies which are particularly stable to aggressive media, such as organic acids and alcohols, and are superior to bodies obtained from conventional epoxide resin systems. This applies especially in the case of mixtures which contain the adduct curing agents (E) or (G).

EXAMPLES (A) Preparation of the curing agents which can be used according to the invention

EXAMPLE 1

(1,3-Diphenyl-1,3-propanediamine)

36.4 g (0.175 mol) of benzylideneacetophenone are dissolved in 100 ml of isopropanol at 45° C. and a solution of 9.6 g of hydrazine hydrate (10% excess) in 25 ml of isopropanol is added. The temperature rises by itself to 70° C. After standing for 12 hours, (during which time the intermediate crystallises out), the mixture is hydrogenated in a total of 250 ml of isopropanol in the presence of 4 g of Raney nickel in an autoclave at 130° C. and under a pressure of at most 20 atmospheres gauge for 9 hours. After removing the catalyst and the solvent, 38.3 g (96.8% of theory) of crude amine are obtained.

For purification, 4.50 g are distilled in a bulb tube oven under 0.08 mm Hg. Yield: 4.11 g; the bulk distils at an oven temperature of 123° C. and under 0.08 mm Hg.

On the basis of investigation by NMR spectroscopy, the product is a mixture consisting of about ⅔ of the meso-form and ⅓ of the d,l-form.

EXAMPLE 2

(1,3-Diphenyl-1,3-propanediamine)

(a) 3,5-Diphenyl-2-pyrazoline (intermediate)

The instructions of S. G. Beech et al (see J. Chem. Soc. (1952), 4,686–90) were modified somewhat in order to prepare the compound.

500 ml of ethanol are added to 312 g (1.5 mols) of benzylideneacetophenone and pure nitrogen gas is passed into the mixture for 10 minutes. 150 g (3 mols) of 80% pure hydrazine hydrate are then added in a single portion. On shaking, the whole solidifies to a solid mass. This is then refluxed for 1 hour. A yellow solution forms which slowly becomes colourless. The solvent and the excess hydrazine are distilled off, finally under a water pump vacuum. 338 g of a yellowish liquid remain and this is distilled. In addition to a small amount of first runnings, 320 g=96% of theory of a yellowish oil with a boiling point under 0.005 mm of 160°–165° C. (literature: boiling point under 0.02 mm, 174°–178° C.) are obtained and this oil solidifies in the receiver. The compound immediately becomes yellow in air and decomposes with the evolution of gas.

(b) 1,3-Diphenyl-1,3-propanediamine 111 g (0.5 mol) of 3,5-diphenyl-2-pyrazoline are hydrogenated with 10 g of freshly prepared Raney nickel in 400 ml of methanol saturated with NH$_3$ for 14 hours at 80° C./100 atmospheres. The catalyst is filtered off and the solvent is removed in a rotary evaporator. Distillation under a high vacuum gives 102 g=90% of theory of a colourless oil½.

EXAMPLE 3

(1-Phenyl-3-(3-pyridyl)-1,3-diaminopropane)

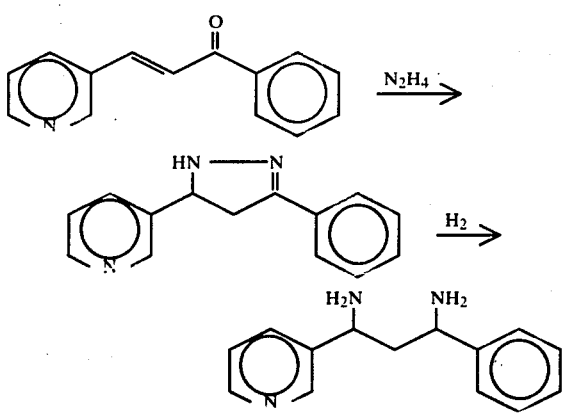

41.8 g (0.2 mol) of 3-pyridalacetophenone (described by C. S. Marvel et al in J. Org. Chem. 20 (1955) 1,785) are heated to 120° C. and 20 g (0.4 mol) of 100% pure hydrazine hydrate are added at a rate such that the exothermic reaction remains under control. The mixture is then stirred for a further 1 hour at 150° C. and the excess hydrazine is distilled off under a water pump vacuum. The crude pyrazoline is hydrogenated in 400 ml of methanol saturated with NH$_3$ with 20 g of fresly prepared Raney nickel for 12 hours at 80° C./100 atmospheres. The catalyst is separated off, the solvent is removed in a rotary evaporator, and the product is distilled under a high vacuum. Fractionation in a 25 cm Vigreux column gives 27.5 g=61% of theory of a yellow oil which has a boiling point under 0.001 mm of 175°–180° C. and which crystallises out at room temperature. After repeated recrystallisation from carbon tetrachloride, the compound melts at 79° C.

EXAMPLE 4

(1-Phenyl-3-(2-tetrahydrofuryl)-1,3-propanediamine)

99 g (0.5 mol) of freshly distilled furfurylideneacetophenone (described by N. L. Drave et al in J. Amer. Chem. Soc. 52 (1930) 4,965) are heated to 120° C. and 50 g (1 mol) of 100% pure hydrazine hydrate are added at a rate such that the exothermic reaction remains under control. The mixture is then stirred for a further 1 hour at 150° C. and the excess hydrazine is distilled off under a water pump vacuum. The crude pyrazine is hydrogenated in 400 ml of methanol saturated with NH$_3$ with 20 g of freshly prepared Raney nickel for 12 hours at 80° C./100 atmospheres. The catalyst is separated off, the solvent is removed in a rotary evaporator and the product is distilled under a high vacuum. Fractionation of this product on a 25 cm Vigreux column gives 99 g=90% of theory of a colourless oil with a boiling point under 0.001 mm of 125° C.

EXAMPLE 5

(1,2-Tetramethylene-3-phenyl-1,3-propanediamine)

3,4-Tetramethylene-5-phenyl-2-pyrazoline (starting material)

The instructions of R. Jacquier et al (see Bull. Soc. Chim. Fr. (1967) 306-15) were employed to prepare the product.

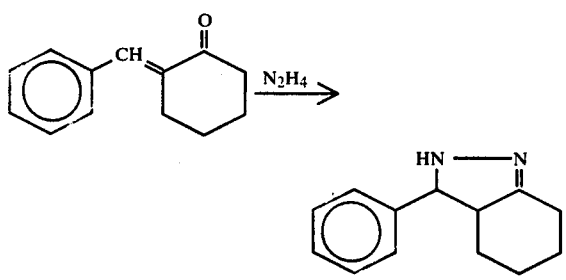

93 g (0.5 mol) of benzalcyclohexanone (see H. M. Walton, J. Org. Chem. 22 (1957) 1,161-65) are boiled with 50 g (1 mol) of 100% pure hydrazine hydrate in 350 ml of ethanol for 4 hours. Distillation through a 25 cm Vigreux column gives 89 g=89% (literature 60%) of a colourless oil which has a boiling point under 0.001 mm of 122°-123° C. (literature: boiling point under 0.5 mm, 137°-142° C.) and which crystallises out after several days.

1,2-Tetramethylene-3-phenyl-1,3-propanediamine

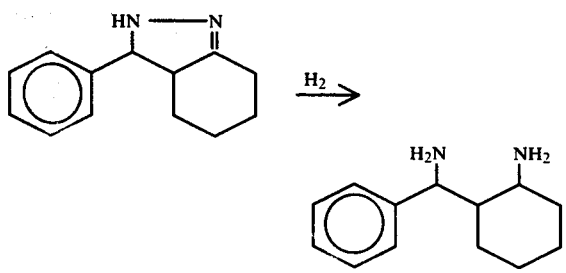

101 g (0.5 mol) of 3,4-tetramethylene-5-phenyl-2-pyrazoline are hydrogenated with 10 g of freshly prepared Raney nickel in 400 ml of methanol saturated with NH$_3$ for 8 hours at 80° C./100 atmospheres. The catalyst is separated off, the solvent is removed in a rotary evaporator and the product is distilled under a high vacuum. Fractionation of the distillate in a 1 m packed column (steel spirals) gives 65 g=63% of theory of a colourless oil with a boiling point under 0.001 mm of 115° C.

EXAMPLE 6

(1-Methyl-3-phenyl-1,3-propanediamine)

160 g (1 mol) of 3-methyl-5-phenyl-2-pyrazoline (according to S. G. Beech et al, J. Chem. Soc. (1952) 4,686-90) are hydrogenated with 20 g of freshly prepared Raney nickel in 400 ml of methanol saturated with NH$_3$ for 6 hours at 80° C./100 atmospheres. The catalyst is separated off, the solvent is removed in a rotary evaporator and the product is distilled under a high vacuum. Fractionation of the distillate in a 25 cm Vigreux column gives 151 g=92% of theory of a colourless oil with a boiling point under 0.03 mm of 90°-91° C. C$_{10}$H$_{16}$N$_2$. (164.24)

calculated: C, 73.12; H, 9.82; N, 17.06; found: C, 73.30; H, 10.04; N, 17.32.

EXAMPLE 7

(1,3-Diphenyl-2-methyl-1,3-propanediamine)

44.4 g (0.2 mol) of benzalpropiophenone (see E. P. Kohler, Am. Chem. J. 31 (1904) 642-61) are heated to 120° C. and 20 g (0.4 mol) of 100% pure hydrazine hydrate are added at a rate such that the exothermic reaction remains under control. The mixture is then heated at 150° C. for a further 1 hour and the excess hydrazine is distilled off under a water pump vacuum. The crude pyrazoline is hydrogenated in 400 ml of methanol saturated with NH$_3$ with 10 g of freshly prepared Raney nickel at 80° C./100 atmospheres for 12 hours. The catalyst is separated off, the solvent is removed in a rotary evaporator and the product is distilled under a high vacuum. Subsequent fractionation in a 25 cm Vigreux column gives 40.5 g=84% of theory of a colourless oil with a boiling point under 0.0001 mm of 153° C.

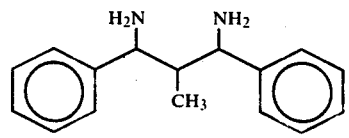

EXAMPLE 8

(1-Methyl-2,3-tetramethylene-1,3-propanediamine)

3-Methyl-4,5-tetramethylene-2-pyrazoline (starting material)

The preparation is carried out by the method of R. Jacquier (see Example 5).

93 g (0.75 mol) of 1-acetyl-cyclohexene and 75 g (1.5 mol) of 100% pure hydrazine hydrate in 400 ml of ethanol are boiled for 24 hours. Distillation through a 25 cm Vigreux column gives, in addition to a large amount of high-boiling residue, 74 g=71% of theory (literature 66%) of a colourless liquid with a boiling point under 0.001 mm of 56° C. (literature: boiling point under 13 mm, 112°-113° C.).

1-Methyl-2,3-tetramethylene-1,3-propanediamine

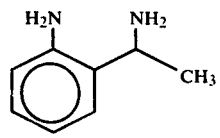

69 g (0.5 mol) of 3-methyl-4,5-tetramethylene-2-pyrazoline are hydrogenated with 10 g of freshly prepared Raney nickel in 350 ml of methanol saturated with NH$_3$ for 6 hours at 80° C./100 atmospheres. The catalyst is separated off, the solvent is removed in a rotary evaporator and the product is distilled off under a water pump vacuum. Fractionation of the distillate in a 25 cm Vigreux column gives 54 g=76% of theory of a colourless oil with a boiling point under 8 mm of 95° C.

EXAMPLE 9

(1,2-Tetramethylene-3,3-pentamethylene-1,3-propanediamine)

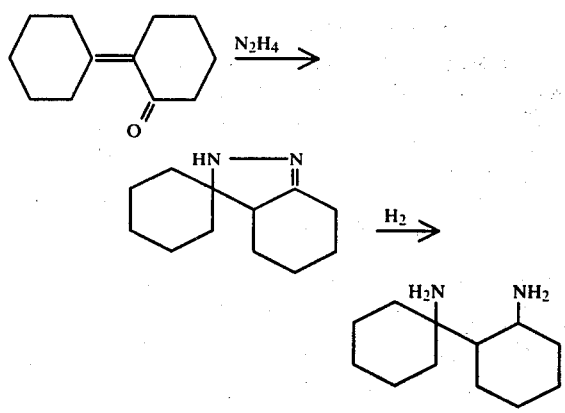

178 g (1 mol) of molten cyclohexylidenecyclohexanone (J. Reese Chem. Ber. 75 (1942), 384–94) are allowed to run, at 100° C., from a dropping funnel into 60 g (1.2 mols) of 100% pure hydrazine hydrate. The mixture is then stirred for a further 1 hour at 150° C. and the water and excess hydrazine are distilled off under a water pump vacuum. The crude pyrazoline is hydrogenated in 300 ml of methanol with 10 g of freshly prepared Raney nickel at 100° C./100 atmospheres for 4 hours. The catalyst is separated off, the solvent is removed in a rotary evaporator and the crude product is distilled under a high vacuum. Fractionation in a 25 cm Vigreux column gives 63 g=32% of a colourless oil with a boiling point under 0.0001 mm of 81° C.

EXAMPLE 10

(1-tert.-Butyl-3-phenyl-1,3-propanediamine)

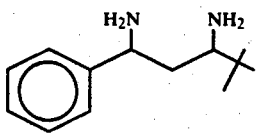

94 g (0.5 mol) of molten benzalpinacolone (Organic Syntheses Coll. Vol. I (1967), 81–82) are allowed to run, at 100° C., from a dropping funnel into 30 g (0.6 mol) of 100% pure hydrazine hydrate. The mixture is then stirred for a further 1 hour at 150° C. and the water and excess hydrazine are distilled off under a water pump vacuum. The crude pyrazoline is hydrogenated in 300 ml of methanol with 10 g of freshly prepared Raney nickel for 3 hours at 150° C./100 atmospheres. The catalyst is separated off, the solvent is removed in a rotary evaporator and the crude product is distilled. This gives 92 g of a colourless oil. It is a mixture of pyrazolidine and diamine in a ratio of about 1:3. The yield of diamine calculated from the gas chromatogram is about 70% of theory. Distillation through a 1 m packed column gives the diamine in the form of a colourless oil with a boiling point under 0.0001 mm of 83° C.

EXAMPLE 11

(1-Phenyl-1,3-propanediamine)

5-Phenyl-2-pyrazoline (starting material)

Literature: J. Elguero and R. Jacquier: Bull. Soc. Chim. Fr. (1965), 769–78.

100 g (2 mols) of 100% pure hydrazine hydrate are added to 132 g (1 mol) of freshly distilled cinnamaldehyde, with cooling. The solid mass of the resulting hydrazone is comminuted somewhat with a spatula and boiled under gentle reflux for 12 hours. The hydrazone goes into solution and two phases form. The excess hydrazine hydrate is distilled off under a water pump vacuum. The residue is distilled under nitrogen, first in a simple distillation apparatus and then through a 25 cm Vigreux column. This gives 120 g=82% of theory of a colourless oil which has a boiling point under 0.005 mm of 84° C. and which decomposes in air after a few minutes, a yellow colouration developing.

1-Phenyl-1,3-propanediamine

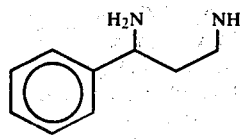

73 g (0.5 mol) of 5-phenyl-2-pyrazoline are hydrogenated in 400 ml of methanol saturated with ammonia with 10 g of freshly prepared Raney nickel for 5 hours at 80° C./100 atmospheres. The Raney nickel is filtered off on a suction filter containing a layer of kieselguhr. The solvent is removed from the filtrate in a rotary evaporator and the residue is distilled in a simple distillation apparatus and then through a 25 cm Vigreux column. This gives 66 g=88% of theory of a colourless oil with a boiling point under 0.0004 mm of 73° C. (literature: boiling point under 21 mm, 138°–141° C.).

EXAMPLE 12

(1,3-Diphenyl-1-methyl-1,3-propanediamine)

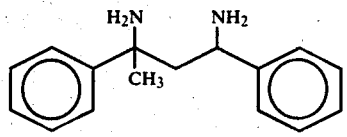

111 g (0.5 mol) of dypnone are heated to 120° C. and 50 g (1 mol) of 100% pure hydrazine hydrate are added at a rate such that the exothermic reaction remains under control. The mixture is then stirred for a further 1 hour at 150° C. and the excess hydrazine is distilled off under a water pump vacuum. The crude pyrazoline is hydrogenated in 400 ml of methanol with 20 g of freshly prepared Raney nickel for 12 hours at 80° C./100 atmospheres. The catalyst is filtered off, the solvent is removed in a rotary evaporator and the product is distilled under a high vacuum. Subsequent fractionation in a 25 cm Vigreux column gives 85 g=70% of theory of a slightly yellowish oil with a boiling point under 0.001 mm of 142° C. About 17% of 2-phenylethylamine also form as a by-product.

(B) Use Examples

EXAMPLES I-XVI

Experiments regarding the use of the curable mixtures according to the invention are summarised in Table I. The requisite constituents are mixed in a conventional manner, in the ratio indicated in Table 1, at room temperature. Examples I to IX describe curable mixtures according to the invention and the use thereof. Examples X to XIII, on the other hand, are comparison examples (state of the art).

In more detail, the following is to be stated in this context. In the main, a liquid, unmodified bisphenol A diglycidyl ether of technical purity with an epoxide content of 5.3 equivalents/kg and a viscosity of about 10,000 cP at 25° C. (resin component $X_1$) is used as the liquid epoxide compound (X). For completion, several more experiments are carried out with a solid epoxide resin based on bisphenol A and having an epoxide content of 2.5 equivalents/kg and a softening range of about 40° C. (epoxide resin $X_2$), a diglycidyl ester of hexahydrophthalic anhydride having an epoxide content of 6.3 equivalents/kg and a viscosity of 450 cP at 25° C. (epoxide resin $X_3$) and also the N,N'-diglycidyl compound obtained from 5,5-dimethylhydantoin and having an epoxide content of 7.85 equivalents/kg and a viscosity after melting of 1,240 cP/25° C. (epoxide resin $X_4$) (see Table 2, Examples XIV–XVI).

As mixtures according to the state of the art, the resins described in Examples X–XIII contain 1,3-diaminopropane as an aliphatic diamine, 4,4'-diamino-3,3'-dimethyl-dicyclohexylmethane as a typical cycloaliphatic diamine and 4,4'-diaminodiphenylmethane as a typical aromatic amine and also 1,10-dicyclohexyl-1,10-diaminodecane.

The following methods are used to determine the various characteristics:

Determination of the reactivity

Differential thermal analysis is used to determine the reactivity. About 20 mg of the resin/curing agent mixture to be tested are warmed in a small Al crucible in the measuring chamber of a type TA 2,000 Differential Thermo Analyzer from Messrs. Mettler at a heating rate of 4° C./minute and the temperature difference between this crucible and an empty crucible warmed at the same time is recorded continuously. The temperatures for the start of reaction, for the maximum reaction rate and for the end of the reaction are read off, as parameters characterising the reactivity, from the curve thus obtained.

Determination of the glass transition temperature 4 g of the resin/curing agent mixture are, in each case, poured into a thin-walled Al crucible of about 5 cm diameter and completely cured in this crucible. A sample is taken from the disc thus obtained in order to determine the glass transition temperature of the crosslinked polymer with the aid of differential thermal analysis. The specific heat changes at the transition point; this change is registered as a turning point in the curve recorded by the DTA apparatus. Conclusions regarding the dimensional stability of the resulting polymer when hot can be drawn from the glass transition temperature.

Determination of the mechanical and dielectric properties of moulding materials The resin/curing agent mixture prepared as described above is first freed, in vacuo, from the air which has been stirred in during mixing and is then poured into aluminium moulds, which have been pre-treated with mould release agents, in order to produce sheets having dimensions of 135×135×4 mm, 135×135×3 mm and 135×135×2 mm and the sheets are completely cured under the conditions indicated in Tables 1 and 2.

Test pieces having dimensions of 15×10×3 mm are sawn out of the 3 mm thick sheets in order to determine the flexural strength, the impact strength and the angle of deflection on the Dynstat apparatus (described in W. Holzmüller/K. Altenberg "Physik der Kunststoffe" ("Physics of Plastics") Akademie-Verlag Berlin, 1961, pages 597–604). The absorption of $H_2O$ is also determined on the same test pieces.

The 4 mm thick sheets are used to produce test pieces having dimensions of 60×10×4 mm for determining the flexural strength and deflection according to VSM Standard Specification 77,103, the impact strength according to VSM Standard Specification 77,105 and the increase in weight after storage in water.

The 2 mm thick sheets are used to determine the dielectric properties.

Test to determine the suitability as an adhesive

A small amount of the resin/curing agent mixture is applied, in each case, to the ends of test strips made of Anticorrodal B which have dimensions of 170×25×1.5 mm and have previously been roughened by grinding and degreased by washing with solvents. In each case, two of these test strips are so adjusted with the aid of a gauge that the ends coated with resin/curing agent mixture overlap by 12 mm. After fixing with a clamp, the adhesive is cured and after cooling the clamp is removed and the tensile shear strength of the glue bond is then tested in a tensile test (DIN 53,183).

Test to determine the properties in respect of lacquer technology

The resin/curing agent mixture is applied, without the addition of a solvent, with the aid of a triangular spreader in a layer 50 μm thick to an iron sheet which has been degreased by washing with trichloroethylene and has dimensions of 350×70×0.8 mm. After curing in an oven, the appearance of the film is assessed visually and the Erichsen deep drawing according to DIN 53,156 and the impact drawing, which is also termed the impact test, (impact from the rear) at 20° C. are determined.

The characteristic values determined for the various test pieces by the methods mentioned are also summarised in Tables 1 and 2.

The test results summarised in Tables 1 and 2 confirm that the amines according to the invention are outstandingly suitable as curing agents for epoxide resins. In all cases, moulding materials and lacquer films which have outstanding mechanical, thermal and electrical properties result.

Table 1

Diverse 1,3-diaminopropanes of the formula I, according to the invention, compared with curing agents of the state of the art

| Use Example | I | II | III | IV | V |
|---|---|---|---|---|---|
| Curing agent according to Example | 11 | 6 | 1 + 2 | 12 | 7 |
| Parts by weight of amine per 100 parts by weight of epoxide resin $X_1$ | 19.8 | 21.7 | 30.0 | 31.6 | 31.8 |
| Thermal analysis $T_S$ °C. | 37 | 42 | 43 | 60 | 36 |
| on TA 2,000 $T_{RRmax}$ °C. | 93 | 104 | 113 + 156 | 126 + 179 | 118 + 187 |
| heating rate 4° C./minute $T_E$ °C. | 227 | 248 | 247 | 237 | 278 |
| Curing | 24 hrs. 40° C.+ 6 hrs. 100° C. | 24 hrs. 40° C.+ 6 hrs. 100° C.+ 6 hrs. 140° C. | 24 hrs. 40° C.+ 6 hrs. 100° C.+ 6 hrs. 140° C. | 24 hrs. 40° C.+ 6 hrs. 100° C.+ 6 hrs. 180° C. | 24 hrs. 40° C.+ 6 hrs. 100° C.+ 6 hrs. 180° C. |
| Impact strength (Dynstat (cmkg/cm$^2$) VSM (cmkg/cm$^2$) | 12.0 | 14.7 | 10.3 | 17.5 | 17.1 |
| Flexural strength Dynstat (kg/cm$^2$) VSM (kg/mm$^2$) | 1,605 | 1,550 | 1,595 | 15.8 | 16.9 |
| Angle of deflection (≥°) Deflection (mm) | 54 | 57 | 57 | 7.5 | 8.6 |
| Class transition temperature on TA 2000 (° C.) | 119 | 150 | 156 | 154 | 145 |
| Heat distortion ISO R 75 (°C.) | | | | 138 | 137 |
| Absorption of water on storage | | | | | |
| 4 days in $H_2O$ at room temperature (%) | 0.31 | 0.45 | 0.29 | 0.36 | 0.32 |
| 1 hour in boiling water (%) | 0.33 | 0.98 | 0.32 | 0.27 | 0.25 |
| Tensile shear strength on Anticorrodal B (kg/mm$^2$) | 1.1 | 1.0 | 1.0 | 2.1 | 1.8 |
| Dielectric loss factor tanδ according to DIN 53,483 tanδ >1% above °C. | 94 | 100$^{x.x}$ | 99$^{x.x}$ | 137 | 130 |
| tanδ >5% above °C. | 116 | 155$^{x.x}$ | 164$^{x.x}$ | 160 | 153 |
| Dielectric constant ε at 25° C. (DIN 53,483) | 4.3 | 4.4$^{x.x}$ | 4.3$^{x.x}$ | 4.2 | 4.2 |
| Specific volume resistivity at 25° C. (Ω cm) (DIN 53,482) | $1,1 \cdot 10^{16}$ | $1,3 \cdot 10^{15\,x.x}$ | $8 \cdot 10^{15\,x.x}$ | $4,6 \cdot 10^{16}$ | $6,5 \cdot 10^{16}$ |
| Appearance of the 50 μm thick lacquer film | satisfactory | satisfactory$^{x.x}$ | satisfactory$^{x.x}$ | brown or otherwise satisfactory | brown or otherwise satisfactory |
| Deep drawing according to Erichsen (mm at 20° C.) | 6.8 | 5.7$^{x.x}$ | 4.6$^{x.x}$ | 5 | >10 |
| Impact drawing (cm/kg Hammer) | 10/1 | <10/1$^{x.x}$ | <10/1$^{x.x}$ | <10/1 | 90/2 |

$^{x.x}$signifies: after-cured at 100° C. only
$T_S$ signifies: Temperature at the Start of the reaction
$T_{RRmax}$ signifies: Temperature at the maximum Rate of Reaction
$T_E$ signifies: Temperature at the End of the Reaction

| Use Example | VI | VII | VIII | IX |
|---|---|---|---|---|
| Curing agent according to Example | 4 | 10 | 5 | 9 |
| Parts by weight of amine per 100 parts by weight of epoxide resin $X_1$ | 28.9 | 27.8 | 27 | 26.5 |
| Thermal analysis $T_S$ °C. | 37 | 43 | 37 | 36 |
| on TA 2,000 $T_{RRmax}$ °C. | 118 + 152 | 120 + 305 | 102 | 92 + 261 |
| heating rate 4° C./minute $T_E$ °C. | 280 | 343 | 255 | 297 |
| Curing | 24 hrs. 40° C.+ 6 hrs. 100° C.+ 6 hrs. 180° C. | 24 hrs. 40° C.+ 6 hrs. 100° C.+ 6 hrs. 180° C. | 24 hrs. 40° C.+ 6 hrs. 100° C.+ 6 hrs. 180° C. | 24 hrs. 40° C.+ 6 hrs. 100° C.+ 6 hrs. 180° C. |
| Impact strength Dynstat (cmkg/cm$^2$) VSM (cm/kg/cm$^2$) | 21 | 13.7 | 10.5 | 16.1 |
| Flexural strength Dynstat (kg/cm$^2$) VSm (kg/mm$^2$) | 15.8 | 1,490 | 1,405 | 1,405 |
| Angle of deflection (≥°) Deflection (mm) | 8.0 | 51 | 3 | 50 |
| Glass transition temperature on TA 2,000 (°C.) | 160 | 138 | 170 | 130 |
| Heat distortion ISO R 75 (°C.) | 145 | | | |
| Absorption of water on storage | | | | |
| 4 days in $H_2O$ at room temperature (%) | 0.41 | 0.6 | 0.34 | 0.84 |
| 1 hour in boiling water (%) | 0.31 | 1.5 | 0.60 | 0.39 |
| Tensile shear strength on Anticorrodal B (kg/mm$^2$) | 2.0 | 2.0 | 1.5 | 2.0 |
| Dielectric loss factor tanδ according to DIN 53,483 tanδ >1% above ° C. | 143 | 108 | 135 | — |
| tanδ >5% above °C. | 162 | 136 | 157 | — |
| Dielectric constant ε at 25° C. (DIN 53,483) | 4.3 | 4.0 | 4.1 | — |
| Specific volume resistivity at 25° C. (Ω cm) (DIN 53,482) | $1,5 \cdot 10^{16}$ | $3,9 \cdot 10^{16}$ | $3,6 \cdot 10^{16}$ | — |
| Appearance of the 50 μm thick lacquer film | brown but otherwise satisfactory | brown but otherwise satisfactory | satisfactory, brown | brown but otherwise satisfactory |
| Deep drawing according to Erichsen (mm at 20° C.) | 8 | 1.2 | 0.7 | 0.8 |
| Impact drawing (cm/kg Hammer) | 90/2 | 20/1 | 10.1 | <10/1 |

Table 1-continued

Diverse 1,3-diaminopropanes of the formula I, according to the invention, compared with curing agents of the state of the art

| Use Example | X (Comparison) | XI (Comparison) | XII (Comparison) | XIII (Comparison) |
|---|---|---|---|---|
| Curing agent according to Example | 1,10-Dicyclo-hexyl-1,10-diaminodecane | 1,3-Diamino-propane | 4,4'-Diamino-3,3'-dimethyldicyclo-hexylmethane | 4,4'-Diamino-diphenylmethane |
| Parts by weight of amine per 100 parts by weight of epoxide resin $X_1$ | 44.5 | 9.8 | 31.5 | 26.2 |
| Thermal analysis $T_S$ °C. | 48 | 31 | 37 | 60 |
| on TA 2,000 $T_{RRmax}$ °C. | 118 + 162 | 86 | 105 | 138 |
| heating rate 4° C./minute $T_E$ °C. | 248 | 183 | 199 | 220 |
| Curing | 24 hrs. 40° C.+ 6 hrs. 100° C. | 24 hrs. 40° C.+ 6 hrs. 100° C. | 4 hrs. 80° C.+ 8 hrs. 140° C. | 4 hrs. 80° C.+ 8 hrs. 140° C. |
| Impact strength Dynstat (cmkg/cm$^2$) | 21 | 20 | 17.2 | 13.2 |
| VSM (cmkg/cm$^2$) | | 28 | 21.3 | 36 |
| Flexural strength Dynstat (kg/cm$^2$) | 1,225 | 1,340 | 1,625 | 1,435 |
| VSM (kg/mm$^2$) | | 13.4 | 13.2 | 13.7 |
| Angle of deflction ($>$°) | 53 | 53 | 54 | 52 |
| Deflection (mm) | | 11.4 | 10 | 13.9 |
| Glass transition temperature on TA 2,000 (°C.0 | 110 | 121 | 170 | 161 |
| Heat distortion ISO R 75 (°C.) | | 117 | 141 | 143 |
| Absorption of water on storage 4 days in H$_2$O at room temperature (%) | 0.2 | 0.3 | 0.3 | 0.3 |
| 1 hour in boiling water (%) | 0.3 | 0.6 | 0.35 | 0.2 |
| Tensile shear strength on Anticorrodal B (kg/mm$^2$) | 0.9 | 0.5 | 0.8 | 0.5 |
| Dielectric loss factor tanð according to DIN 53,483 tanð >1% above °C. | 98 | 65 | 152 | 151 |
| tanð >5% above °C. | 132 | 99 | 171 | 187 |
| Dielectric constant ε at 25° C. (DIN 53,483) | 3.9 | 4.8 | 4.1 | 4.7 |
| Specific volume resistivity at 25° C. (Ω cm) (DIN 53,482) | 6,4.10$^{16}$ | 2,7.10$^{15}$ | 3.10$^{16}$ | 1,5.10$^{16}$ |
| Appearance of the 50 μm thick lacquer film | satisfactory | turbid, craters | satisfactory | yellow but otherwise satisfactory |
| Deep drawing according to Erichsen (mm at 20° C.) | 7.3 | 7.2 | 5.3 | 3.4 |
| Impact drawing (cm/kg Hammer) | 40/1 | 90/1 | 50/1 | 50/1 |

Table 2

| Use Example | XIV | XV | XVI |
|---|---|---|---|
| Epoxide resin | 100 parts by weight of epoxide resin $X_2$ | 100 parts by weight of epoxide resin $X_3$ | 100 parts by weight of epoxide resin $X_4$ |
| Curing agent according to Examples 1 and 2 | 14.1 | 35.6 | 44.3 |
| Curing | 6 hrs. 100° C.+ 6 hrs. 140° C. | 24 hrs. 40° C.+ 6 hrs. 100° C.+ 6 hrs. 140° C. | 24 hrs. 40° C.+ 6 hrs. 100° C.+ 6 hrs. 140° C. |
| Impact strength VSM (cm/kgcm$^2$) | 35 | 8.5 | 8.5 |
| Flexural strength VSM (N/mm$^2$) | 98 | 76 | 130 |
| Deflection (mm) | 5.3 | 3.0 | 4.5 |
| Heat distortion (°C.) | 99 | 111 | 162 |
| Glass transition temperature measured on TA 2,000 (°C.) | 103 | 122 | 178 |
| Tensile shear strength (N/mm$^2$) | 16 | 17 | 7.5 |
| Absorption of H$_2$O after 4 days at room temperature (%) | 0.34 | 0.47 | 1.83 |
| Absorption of H$_2$O after 1 hour in boiling water % | 0.35 | 0.82 | 1.02 |

EXAMPLES XVII–XXVII (Solvent-free coating systems; adduct curing agents (E) and (G))

Preparation of the adduct curing agents

Adduct curing agent XVII 61 g of a liquid epoxide resin (Z) based on bisphenol F and having an epoxide equivalent weight of 168 and a viscosity of 7,500 cP (25° C.) are mixed together with 179 g of dibutyl phthalate and 270 g of 1,3-diphenyl-1,3-propanediamine in a three-necked flask and the mixture is heated to 120° C., with stirring. 17 g of phenylglycide are then added dropwise and the mixture is stirred for 20–25 minutes, during which time the reaction temperature rises by about 7° C. by itself. 33.5 g of salicyclic acid are then added, with the heating switched off, until everything has dissolved. After cooling to about 50° C., the liquid epoxide/amine adduct curing agent (E) is discharged. The physical and chemical characteristics of this product and of the products prepared according to the examples which follow are summarised in Table 3.

Adduct curing agent XVIII

The procedure followed is precisely the same as that for the preparation of curing agent XVII except that a liquid epoxide resin (Z) which is based on bisphenol A and has an epoxide equivalent weight of 188 and a viscosity of 11,350 cP (25° C.) is used. The characteristics of this adduct curing agent can also be taken from Table 3.

Adduct curing agent XIX

In accordance with the same preparation process, 52 g of the liquid epoxide resin (Z), based on bisphenol F, of Example 1, 152 g of benzyl butyl phthalate, 229.5 g of 1,3-diphenyl-1,3-propanediamine and 14.5 g of phenylglycide are reacted and, finally, 28.5 g of salicyclic acid are added (characteristics: see Table 3).

Adduct curing agent XX

Under the same reaction conditions and using the same amounts of the reactants as described in the case of curing agent XVII, an analogous adduct curing agent is prepared except that diphenoxyethylformal is used as the flexibilising component in place of dibutyl phthalate.

Adduct curing agent XXI 444 g of 4-nonylphenol are initially introduced into a three-necked flask and 300 g of 1-phenyl-1,3-propanediamine are added at 70° C., with stirring. After a reaction time of 20 minutes at 70°–80° C., the reaction is discontinued and the product is discharged at 50° C.

Adduct curing agent XXII 264 g of 4-nonylphenol are intitially introduced into a three-necked flask and 360 g of 1-phenyl-1,3-propanediamine are added dropwise at 70° C. in the course of 25 minutes. 152 g of a liquid epoxide resin (Z) which is based on bisphenol A and has an epoxide equivalent weight of 193 and a viscosity of 9,850 cP (25° C.) are then added. The temperature rises to 95° C. in the course of 15 minutes. After cooling, the product is discharged at 50° C.

Adduct curing agent XXIII (Comparison)

An adduct curing agent was prepared from 444 g of 4-nonylphenol and 272 g of m-xylylenediamine under reaction conditions the same as those described above for the preparation of adduct curing agent XVIII.

Adduct curing agent XXIV (Comparison)

An adduct curing agent is prepared from 264 g of 4-nonylphenol, 336 g of m-xylylenediamine and 152 g of the liquid epoxide resin (Z) used for the preparation of adduct curing agent XIX, by the same process.

Mixed curing agent XXV 500 g of curing agent XVII are combined with 150 g of curing agent XXIII. This modification improves the appearance of the film on curing under extreme conditions, for example at low temperatures (5° C.) and high atmospheric humidity (20° C./100% relative humidity).

Mixed curing agent XXVI 450 g of curing agent XVII are combined with 170 g of curing agent XXIII. This modification likewise improves the appearance of the film on curing under extreme conditions and also somewhat increases the stability, especially towards 50% strength ethyl alcohol.

Adduct curing agent XXVII (Comparison curing agent based on 4,4'-diamino-diphenylmethane epoxide resin)

Table 3

Characteristics of the curing agents (examples)

| Curing agent Example No. | Viscosity at 25° C. in cP (according to Hoeppler) | Amine number | H equivalent weight | Suitable mixing ratios for curable mixtures Parts by weight of epoxide resin (X): parts by weight of adduct curing agent (E) or (G) |
|---|---|---|---|---|
| XVII | 31,200 | 3.84–3.83 | 147 | 100 : 76 |
| XVIII | 21,900 | 3.85–3.86 | 157 | 100 : 81 |
| XIX | 173,000 | 3.83–3.85 | 147 | 100 : 76 |
| XX | 65,400 | 3.82–3.83 | 147 | 100 : 76 |
| XXI | 545 | 5.39–5.41 | 93 | 100 : 48.5 |
| XXII | 5,680 | 6.70–6.73 | 89 | 100 : 46 |
| XXIII (Comparison) | 300 | 5.6 | 90 | 100 : 47 |
| XXIV (Comparison) | 3,300 | 6.55 | 84 | 100 : 44 |
| XXV | 7,400 | 2.35 | 125 | 100 : 65 |
| XXVI | 5,900 | 2.37 | 119 | 100 : 62 |
| XXVII (Comparison) | 6,700 | 4.5 | 115 | 100 : 60 |

USE OF THE ADDUCT CURING AGENTS

EXAMPLES XVII TO XXVII

The test results relating to the use of the curable mixtures, according to the invention, which contain adduct curing agents are summarised in Table 4.

The Erichsen deep drawing was determined according to DIN 53,156 and the impact drawing (impact test) was determined by a known laboratory method.

The test results show that the mixtures according to the invention, which contain the adduct curing agents XXI, XXII and XXV to XXVII, have very good properties and lead to outstanding lacquer coatings. The low viscosity, the good drying to touch, the good through-curing time, the high flexibilities of the films (Erichsen values), the improved adhesion on sand-blasted sheet steel and the short curing time at low temperatures (5° C.) are to be singled out in particular.

Initial tests have shown that the stability of the coatings based on the mixtures according to the invention towards dilute acetic acid and ethyl alcohol, which are amongst the aggressive media, is also especially good.

The improved colour stability of the coatings compared with that of conventional lacquer coatings is also to be singled out. This makes it possible to produce white-pigmented inner linings for tanks.

and curing agent are poured into moulds directly after mixing and immediately cured at elevated temperature.

The pre-reaction products which are still fusible are stored in the powdered state in tins at room temperature and their reactivity and their softening range are checked at specific intervals. The following experimental methods are used for this purpose:

Determination of the softening range using a Koffler heated bench, supplemented by determination of the gel time on thermostatically controlled hot-plates which Table 4

Adduct curing agents in epoxide resin mixtures in the lacquer field:
(Mixing ratios curing agent: liquid epoxide resin: see Table 3). 200 μm wet film applied. A bisphenol A resin
(epoxide equivalent weight 194, viscosity 11,330 cP (25° C.)) was used as the liquid epoxide resin (X).

| Use Example | XXI | XXII | XXIII (Comparison) | XXIV (Comparison) | XXV | XXVI | XXVII (Comparison) |
|---|---|---|---|---|---|---|---|
| Curing agent | XXI | XXII | XXIII | XXIV | XXV | XXVI | XXVII |
| Gel time for 100 ml (Tecam apparatus) | 22 minutes | 33 minutes | 15 minutes | 20 minutes | 90 minutes | 75 minutes | 140 minutes |
| Viscosity of the mixture (25° C.) cP | 2,600 | 7,800 | 5,000 | 8,000 | 7,080 | 6,610 | 9,000 |
| Time for drying to touch/hours | 6 | 4 | 3 | 4 | 12 | 8 | 12 |
| Through-curing time/hours | 8 | 5 | 2 | 3 | 24 | 18 | 15 |
| Appearance of the film 20° C./65% relative humidity | good | good | very good | very good | very good | good | good |
| Appearance of the film 20° C./100% relative humidity | good | good | reasonable | reasonable | good | good | good |
| Appearance of the film 5° C./45% relative humidity | good | good | good | reasonable | good | good | good |
| Hardness (Persoz) seconds/7 days | 310 | 365 | 340 | 370 | 215 | 225 | 345 |
| Erichsen m/m/7 days | 2.2 | 0.6 | 3–5 | 2–4 | 8.3 | 7.8 | <2 |
| Impact cm kg | 10 | 10 | 20 moderately | 30 moderately | 20 | 20 | ~40 |
| Adhesion on sand-blasted sheet steel | reasonable | good | good | good | good | good | reasonable |
| Stability to boiling water (6 hours/96° C.) | good | good | good | good | good | good | good |
| Curing at 5° C./hours | <48 | <24 | <24 | <24 | >72 | ~72 | ~72 |

Reactive pre-reaction products which are still fusible and are stable on storage (B-stages)

In order to produce B-stages, homogeneous mixtures are prepared which are similar to the mixtures illustrated in Table 1. In the cases where these mixtures contain solid curing agents, the mixture is heated to temperatures above the melting point of the curing agent and the melt is poured into shallow dishes. If the mixtures are from the start liquid at room temperature, these are introduced directly into the dishes, without prior heating. In both cases, the compositions are left to stand for 24 hours at room temperature and in individual cases are also left to stand for some time at 50° C. or 60° C. Finally, B-stages are obtained which are still fusible and which after melting and curing give properties which are the same as those obtained when the resin are regulated to 120° C. and 140° C. Also testing of the tensile shear strength.

The values determined for the various systems by the methods mentioned are summarised in Table 5.

Assessment of the B-stages of the mixtures according to the invention

Table 5 shows that the mixtures according to the invention give pre-reaction products (B-stages) which have considerably better stabilities on storage than do B-stages obtained from the same epoxide resin and cycloaliphatic diamines or even than do B-stages containing aromatic diamines. The stability on storage is also considerably improved compared with that of pre-reaction products with 1,10-diamino-1,10-dicyclohexyldecane. This favourable stability on storage of the B-stages according to the invention is particularly surprising because the curing agents contained in the B-stages are chemically to be classified as aliphatic diamines.

Table 5

The stability of the B-stages of curable mixtures according to the invention compared with that of B-stages of conventional systems (explanation of the symbols at the end of the Table)

| | | | Test | | | |
|---|---|---|---|---|---|---|
| | | | | Measurement on a Koffler bench or B-time plate | | Tensile shear strength after curing for 8 |
| Mixture | B-stage reached after | Storage at RT (days) | Softening point (°C.) | Gel time at 120°C. | Gel time at 140° C. | hours at 140° C. N/mm² |
| 100 parts by weight of epoxide resin $X_1$ 26.2 parts by weight of 4,4'-DADPM (conventional) | 24 hours at RT + 45' 60° C. | 1 | 72 | 2'50" | 1'40" | 5 |
| | | 5 | 75 | 2'05" | 1'20" | — |
| | | 30 | 90 | 27" | 20" | — |
| | | 60 | ** | * | * | * |
| | | 90 | ** | * | * | * |

Table-continued

The stability of the B-stages of curable mixtures according to the invention compared with that of B-stages of conventional systems (explanation of the symbols at the end of the Table)

| Mixture | Test B-stage reached after | Storage at RT (days) | Measurement on a Koffler bench or B-time plate | | | Tensile shear strength after curing for 8 hours at 140° C. N/mm² |
|---|---|---|---|---|---|---|
| | | | Softening point (°C.) | Gel time at 120°C. | Gel time at 140° C. | |
| 100 parts by weight of epoxide resin X₁ 31.5 parts by weight of 4,4'-DA-3,3'-DM (conventional) | 24 hours at RT | 1 | 72 | 1'40" | 1'04" | 7 |
| | | 5 | 80 | 1'20" | 55" | — |
| | | 30 | 90 | 20" | 15" | — |
| | | 60 | ** | * | * | * |
| | | 90 | ** | * | * | * |
| 100 parts by weight of epoxide resin X₁ 44.5 parts by weight of 1,10-DC-1,10-DA (conventional) | 24 hours at RT + 2 hours at 60° C. | 0 | 60 | 6'45" | 4'15" | — |
| | | 5 | 80 | * | * | — |
| | | 90 | ** | * | * | — |
| 100 parts by weight of epoxide resin X₁ 21.7 parts by weight of the curing agent according to Example 6; 1-Methyl-3-phenyl-1,3-propanediamine | 24 hours at RT | 3 | 72 | 2'05" | 1'30" | — |
| | | 10 | 72 | 1'50" | 1' | — |
| | | 30 | 72 | 1'02" | 40" | — |
| | | 60 | 77 | 58" | 30" | — |
| | | 90 | 78 | 48" | 25" | — |
| 100 parts by weight of epoxide resin X₁ 30 parts by weight of the curing agent according to Example 1 and 2; 1,3-Diphenyl-1,3-propanediamine | 24 hours at RT | 3 | 70 | 12'40" | 6'30" | — |
| | | 10 | 70 | 10'55" | 5'15" | — |
| | | 30 | 70 | 7'15" | 4'25" | — |
| | | 60 | 76 | 7' | 4'10" | — |
| | | 90 | 76 | 6'15" | 3'55" | — |
| 100 parts by weight of epoxide resin X₁ 31.8 parts by weight of the curing agent according to Example 12; 1,3-Diphenyl-1-methyl-1,3-propanediamine | 24 hours at RT | 0 | <50 | 45' | 23' | 18 |
| | | 3 | <50 | 45' | 23' | 19 |
| | | 10 | 60 | 37' | 23' | 12 |
| | | 30 | 62 | 37' | 23' | 13 |
| | | 60 | 66 | 33' | | 17 |
| | | 90 | 67 | 31' | 18.5' | 12 |
| 100 parts by weight of epoxide resin X₁ 31.8 parts by weight of the curing agent according to Example 7; 1,3-Diphenyl-2-methyl-1,3-propanediamine | 24 hours at RT | 0 | 52 | 53' | 27' | 15 |
| | | 3 | 52 | 53' | 27' | 20 |
| | | 10 | 58 | 45' | 26' | 14 |
| | | 30 | 62 | 47' | 26' | 13 |
| | | 60 | 64 | 42' | 25' | 14 |
| | | 90 | 66 | 39' | 23' | 13 |
| 100 parts by weight of epoxide resin X₁ 28.9 parts by weight of the curing agent according to Example 4; 1-Phenyl-3-(2-tetrahydrofuryl)-1,3-propanediamine | 24 hours at RT | 0 | 50 | 7'30" | 4'30" | 13 |
| | | 3 | 56 | 7'15" | 3'30" | 15 |
| | | 10 | 64 | 5'30" | 2'45" | 7 |
| | | 30 | 68 | 5' | 2'30" | 8 |
| | | 60 | 70 | 4'45" | 2'05" | 12 |
| | | 90 | 76 | 3'45" | 1'55" | 10 |
| 100 parts by weight of epoxide resin X₁ 27.8 parts by weight of the curing agent according to Example 10; 1-tert.-Butyl-3-phenyl-1,3-propanediamine | 24 hours at RT + 12 hours at 50° C. | 0 | <40 | >43' | 30'30" | 19 |
| | | 3 | 58 | 41' | 27' | 20 |
| | | 10 | 64 | 37' | 26' | 16 |
| | | 30 | 68 | 30' | 18' | 21 |
| | | 50 | 70 | 29'45" | 17'30" | 16 |
| | | 90 | 70 | 28'45" | 17'15" | 14 |
| 100 parts by weight of epoxide resin X₁ 27.5 parts by weight of the curing agent according to Example 5; 1,2-Tetramethylene-3-phenyl-1,3-propanediamine | 24 hours at RT | 0 | 54 | 8'10" | 4'40" | 18 |
| | | 5 | 68 | 6'25" | 4'20" | 13 |
| | | 10 | 70 | 6'05" | 4'05" | 12 |
| | | 30 | 72 | 5'20" | 3'45" | 11 |
| | | 60 | 74 | 5' | 3'45" | 8 |
| | | 90 | 80 | 4'30" | 3'20" | — |
| 100 parts by weight of epoxide resin X₁ 26.5 parts by weight of the curing agent according to Example 9; 1,2-Tetramethylene-3,3-pentamethylene-1,3-propanediamine | 24 hours at RT | 0 | 45 | >45' | >45' | 21 |
| | | 3 | 60 | >45' | >45' | 20 |
| | | 10 | 64 | >45' | >45' | 21 |
| | | 30 | 66 | >45' | >45' | 19 |
| | | 60 | 66 | >45' | >45' | 13 |
| | | 90 | 66 | >45' | >45' | 14 |

Explanation of the symbols
4,4'-DADPM (= Comparison curing agent XIII) = 4,4'-diamino-diphenylmethane
4,4'-DA-3,3'-DM (= Comparison curing agent XII) = 4,4'-diamino-3,3'-dimethyl-dicyclohexylmethane
1,10-DC-1,10-DA (= Comparison curing agent X) = 1,10-dicyclohexyl-1,10-diaminodecane
*Melting point too high; gel time and tensile shear strength can no longer be determined
**No softening point can be determined
RT = Room temperature

EXAMPLES XXVIII–XXXIII (ADHESIVES)

100 g amounts of a liquid epoxide resin obtained from bisphenol A and epichlorohydrin and having an epoxide equivalent weight of 188 are mixed (a) with 10 g of propylenediamine (H equivalent weight 18.5), (b) with 20 g of 1-phenylpropylenediamine (curing agent according to Example 11) (H equivalent weight 37.5) and (c) with 30 g of 1,3-diphenyl-1,3-propylenediamine (curing agent according to Example 1) (H equivalent weight 56.5).

Nonwoven nylon fabrics (15 g/m²) are impregnated with these adhesive mixtures and rolled up between cover films made of polyethylene. The impregnated nonwovens are tack-free after 24 hours and on tensile shear samples of Anticorrodal 100 B according to DIN 53,283 give the following strengths after curing for 30 minutes at 120° C:

EXAMPLE 6

| Storage time of the film, days at 25° C. | Test temperature °C. | Example XXVIII (Comparison) a | Example XXIX b | Example XXX c |
|---|---|---|---|---|
| | | Tensile shear strength N/mm² | | |
| 0 | 23 | 12–13 | 16–18 | 10–12 |
| 1 | 23 | — | 16–18 | 10–12 |
| 4 | 23 | — | 6–8 | 10–12 |
| 90 | 23 | — | — | 12–13 |
| 90 | 100 | — | — | 10–12 |

As can clearly be seen from the results, propylenediamine (a) does not give a stable B-stage, the curing agent according to Example 11 gives a moderately stable B-stage and, finally, the curing agent according to Example 1 gives a stable B-stage.

EXAMPLE XXXI 100 parts by weight of a mixture of 90 g of the epoxide resin used in Example XXVIII, 10 g of butanediol diglycidyl ether having an epoxy equivalent of 108 and 20 g of an adduct of equal parts of the epoxide resin according to Example XXVIII and a liquid butadiene-nitrile rubber having carboxyl terminal groups (HYCAR CTBN from Messrs. Goodrich), which is produced in the course of 60 minutes at 180° C., are mixed at 23° C. with 35 parts by weight of a curing agent which is prepared by dissolving 6 g of resorcinol in 30 g of the curing agent according to Example 1 at 100° C.

This mixture is also used to produce an adhesive film according to Example XXVIII and after 16 hours this forms a tack-free B-stage and has the following properties:

Gel time in a thin layer at 100° C. (hot-plate): 6 minutes
Tensile shear strength at 23° C. according to DIN 53,283 after curing for 20 minutes: 14–16 N/mm²
Tensile shear strength at 100° C.: 12–14 N/mm²
Roll peel strength at 23° C. according to British Standard DTD 5,577: 5–6 N/mm.

EXAMPLE XXXII 100 g of an epoxide resin mixture according to Example XXXI are mixed with 27 g of 1-phenyl-2,3-tetramethylenepropylenediamine (curing agent according to Example 5) having a H equivalent of 51 and, on the one hand, an adhesive film is produced according to Example XXVIII and this has the following properties:

Gel time at 120° C. in a thin layer (hot-plate): 10 minutes.
Tensile shear strength at 23° C. after curing for 20 minutes at 120° C.: 14–16 N/mm².
Tensile shear strength with an adhesive film stored for 2 weeks at 25° C.: 13–15 N/mm².

On the other hand, part of the mixture is poured out in a layer thickness of 3–5 mm and left to lie. A B-stage forms and this is ground after 24 hours. The ground powder is scattered on pre-warmed (100° C.) metal sheets for tensile shear tests and a film which levels well forms. The metal sheets coated in this way are bonded and cured for 20 minutes at 120° C. and the following tensile shear strengths are measured:

| Storage time of the powder at 23° C. days | Tensile shear strength on Anticorrodal 100 B N/mm² |
|---|---|
| 1 | 12–14 |
| 20 | 11–13 |

EXAMPLE XXXIII 100 g of the epoxide resin according to Example XXVIII are mixed with 4 g of an agent for imparting thixotropic properties, i.e. Silodex 24 from Messrs. Grace, Baltimore, U.S.A. (this product is asbestos in fibre form) and with 20 g of 1-phenyl-propylenediamine (curing agent according to Example 11) having a H equivalent of 37.5 and a slightly thixotropic dipping resin composition forms which can be processed over a period of about 2½ hours.

Condensers and aluminum sheets are coated with this composition and stored at 23° C. The coating is dry to touch after 4–5 hours.

After storing for 16 hours at room temperature, the condensers are completely cured at 100° C. for 20 minutes without any blooming of the coating composition being discernible. A hard coating with good covering of the edges forms.

The aluminum sheets which were also coated are bonded after storing for 24 hours at 23° C. and cured at 120° C. for 20 minutes.

The tensile shear strength at 23° C. is 16–18 N/mm².

What is claimed is:

1. A curable mixture comprising (a) a polyepoxide compound (x) having on average more than one epoxide group per molecule; and (b) a 1,3-diaminopropane of the formula I

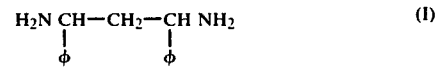

wherein 0.5 to 1.5 equivalents of active hydrogen atoms of the 1,3-diaminopropane per 1 equivalent of epoxide groups in the epoxide compound (x) are present.

2. A mixture according to claim 1 which comprises the 1,3-diaminopropane of the formula I in the form of an adduct curing agent (E) having an amine number of 3.5 to 7.0, said adduct being obtained from the 1,3-diaminopropane of the formula I and a liquid epoxide compound (Z) having on average more than one epoxide group per molecule, and optionally phenylglycide, in which mixture there are 0.8 to 1.2 equivalents of active hydrogen atoms bonded to the nitrogen atoms of the adduct curing agent (E) per 1 equivalent of epoxide groups in the epoxide compound (X).

3. A mixture according to claim 2, wherein the adduct curing agent (E) contains a bisphenol A epoxide resin or bisphenol F epoxide resin as the liquid epoxide compound (Z).

4. A mixture according to claim 2 which comprises an adduct curing agent (E) which has been prepared by reacting the 1,3-diaminopropane of the formula I with the epoxide compound (Z) and with phenylglycide at a temperature of 120° C. to 200° C., the 1,3-diaminopropane, the epoxide compound (Z) and the phenylglycide having been in the molar ratio of 1.2:0.16:0.11 in the reaction mixture.

5. A mixture according to claim 2, which comprises an adduct curing agent (E) which additionally contains 25 to 35% by weight, relative to the pure adduct curing agent, of a plasticiser and optionally 5 to 10% by weight of salicylic acid.

6. A mixture according to claim 1, which comprises the 1,3-diaminopropane of the formula I in the form of an adduct curing agent (G) having an amine number of 3.5 to 7.0, said adduct being obtained from the 1,3-diaminopropane of the formula I and an alkylphenol or a polyhydric phenol and optionally a liquid epoxide compound (Z) having, on average, more than one epoxide group per molecule, in which mixture there are 0.8 to 1.2 equivalents of active hydrogen atoms bonded to the nitrogen atoms of the adduct curing agent (G) per 1 equivalent of epoxide groups in the epoxide compound (X).

7. A mixture according to claim 6, wherein the adduct curing agent (G) comprises nonylphenol as the alkylphenol.

8. A mixture according to claim 6, wherein the adduct curing agent (G) comprises resorcinol as the polyhydric phenol.

9. A mixture according to claim 6, which comprises an adduct curing agent (G) which additionally contains 25 to 35% by weight, relative to the pure adduct curing agent, of a plasticiser and optionally 5 to 10% by weight of salicylic acid.

* * * * *